F. P. BACON.
SPRING WHEEL.
APPLICATION FILED MAY 28, 1913.
1,090,373.
Patented Mar. 17, 1914.
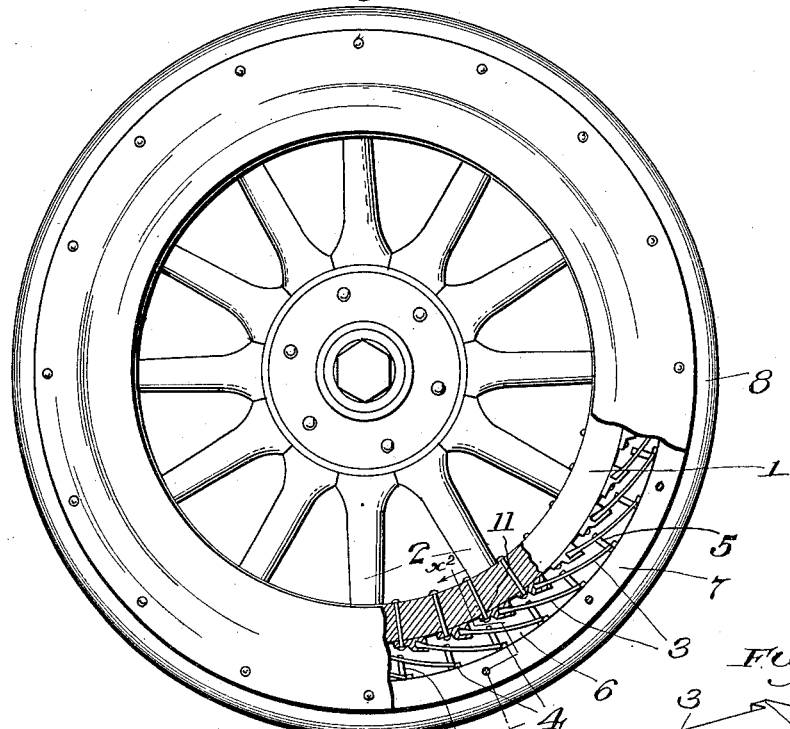
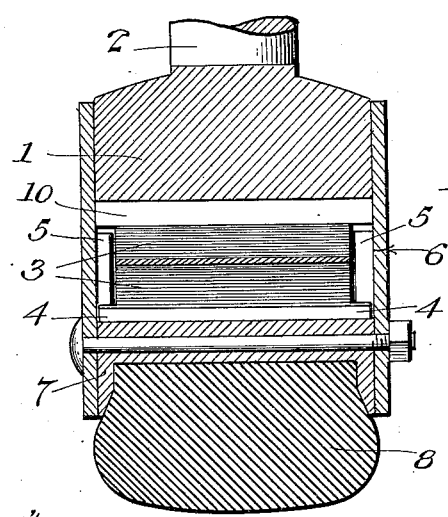
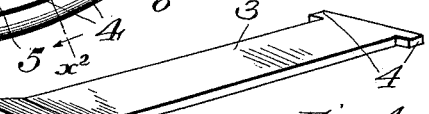
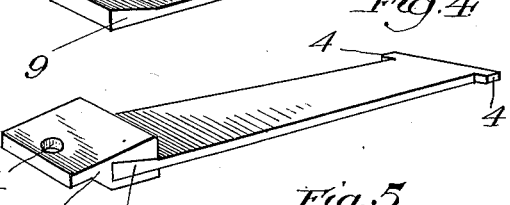
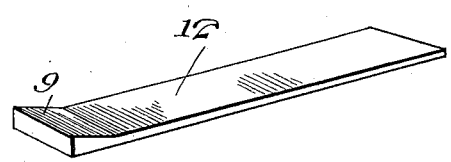
Witnesses:
Inventor:
Frank P. Bacon.
by Lyons & Hackley
attys.

UNITED STATES PATENT OFFICE.

FRANK P. BACON, OF LOS ANGELES, CALIFORNIA.

SPRING-WHEEL.

1,090,373.

Specification of Letters Patent. Patented Mar. 17, 1914.

Application filed May 28, 1913 Serial No. 770,507.

*To all whom it may concern:*

Be it known that I, FRANK P. BACON, a citizen of the United States, residing at Los Angeles, in the county of Los Angeles and State of California, have invented a new and useful Spring-Wheel, of which the following is a specification.

This invention relates to spring wheels and has for its object to produce a spring wheel of a comparatively simple construction, which will have the required resiliency and permit the springs to be readily inserted or removed.

Other advantages will be brought out in the following description.

Referring to the drawings: Figure 1 is a side elevation of the wheel with a part broken away to show the spring construction. Fig. 2 is a section on line $x^2$—$x^2$, Fig. 1. Fig. 3 is a perspective of the spring in detail. Fig. 4 is a perspectve of a spring and its supporting block. Fig. 5 is a perspective of another form of spring.

The wheel comprises an inner rim 1 to which the spokes 2 are attached and a series of springs 3 are secured to the inner rim 1, each spring at its outer end having laterally projecting lugs 4 which are adapted to engage radial ribs 5 formed on side plates 6, the plates being bolted or otherwise secured to the outer rim 7, which is channeled to receive the tire 8. The springs at their inner ends are swaged to form wedge shaped heads 9 which are slipped edgewise into wedge shaped slots formed in blocks 10, which are secured to the inner rim 1 by bolts 11.

If desired a plain form of spring 12 shown in Fig. 5 may be employed wherein the projecting lugs 4 are dispensed with.

In operation as the inner rim 1 is revolved it draws upon the springs 3 and the lugs 4 of the springs acting against ribs 5 turn the plates 6 and thereby carry the outer rim 7 around with the inner portion of the wheel. The slidable relation of the plates 6 with respect to the inner rim permits the necessary spring action while the ribs 5 allow the lugs 4 to slide with respect thereto during the sliding of the plates 6 and at the same time serve to give a positive drive. Where the plain spring 12 is used, as in Fig. 5, the friction of the springs against the outer rim is depended upon to transmit the necessary movement to the outer rim. The plates 6 also act to house the parts and protect them from mud and dirt or damage.

What I claim is:

1. In a spring wheel, an inner rim, a series of blocks with wedge shaped recesses secured to the inner rim, springs with wedge shaped heads in said recesses, said springs having laterally projecting lugs at their outer ends, an outer rim, and circular plates secured to the outer rim, said circular plates having radial ribs which are engaged by said lugs.

2. In a spring wheel, an inner rim, a series of blocks secured thereto, each of said blocks having a wedge shaped recess, a plurality of springs carried by a set of blocks, each of said springs having a wedge shaped head received in the associated recess in a block, the outer ends of said springs bearing against the outer rim.

3. In a spring wheel, an inner rim, springs coupled to said rim, said springs having laterally projecting lugs at their outer ends, an outer rim, circular plates secured to one of said rims, and ribs on said circular plates adapted to be engaged by said lugs.

In testimony whereof, I have hereunto set my hand at Los Angeles, California, this 20th day of May, 1913.

FRANK P. BACON.

In presence of—
GEO. T. HACKLEY,
F. ALICE CRANDALL.

---

Copies of this patent may be obtained for five cents each, by addressing the "Commissioner of Patents, Washington, D. C."